(12) United States Patent  
Dunlap, III

(10) Patent No.: US 8,046,996 B2
(45) Date of Patent: Nov. 1, 2011

(54) MASTER CYLINDER ASSEMBLY FOR A HYDRAULIC ACTUATION SYSTEM FOR A HANDLEBAR-STEERED VEHICLE

(75) Inventor: Charles Emmett Dunlap, III, Manitou Springs, CO (US)

(73) Assignee: SRAM, LLC, Chicago, IL (US)

( * ) Notice: Subject to any disclaimer, the term of this patent is extended or adjusted under 35 U.S.C. 154(b) by 504 days.

(21) Appl. No.: 12/390,937

(22) Filed: Feb. 23, 2009

(65) Prior Publication Data

US 2009/0205330 A1    Aug. 20, 2009

Related U.S. Application Data

(63) Continuation-in-part of application No. 11/761,194, filed on Jun. 11, 2007, now Pat. No. 7,757,488.

(51) Int. Cl.
*F15B 7/08* (2006.01)
*B60T 11/26* (2006.01)

(52) U.S. Cl. ............................................. 60/594; 60/588

(58) Field of Classification Search .................... 60/565, 60/588, 594
See application file for complete search history.

(56) References Cited

U.S. PATENT DOCUMENTS

| 6,003,639 | A | 12/1999 | Buckley et al. |
| 6,769,254 | B2 | 8/2004 | Heller et al. |
| 6,871,729 | B2 | 3/2005 | Huster et al. |
| 6,957,534 | B2 * | 10/2005 | Lumpkin ......................... 60/588 |
| 6,973,784 | B2 | 12/2005 | Okuma |
| 7,219,495 | B2 | 5/2007 | Ludsteck et al. |
| 7,757,488 | B2 * | 7/2010 | Dunlap, III ..................... 60/594 |
| 2006/0213192 | A1 | 9/2006 | Henifin |
| 2008/0302101 | A1 | 12/2008 | Dunlap, III |

FOREIGN PATENT DOCUMENTS

GB    2141498    12/1984

* cited by examiner

*Primary Examiner* — Michael Leslie
(74) *Attorney, Agent, or Firm* — Milan Miloseciv; Lisa Serdynski; Steven Courtright

(57) ABSTRACT

A master cylinder assembly for a hydraulic actuation system for a handlebar-steered vehicle including a fluid cavity having an adjustable length. The master cylinder assembly generally includes a housing, a piston assembly, an actuator and an adjuster. The housing is mountable to a frame member and includes a chamber having a fluid cavity with first and second regions. The first region is in fluid communication with the hydraulic actuation system. The piston assembly includes a piston slidably disposed within the fluid cavity. The actuator is operatively connected to the housing and operatively connected to the piston to slidably displace the piston between an open fluid circuit position permitting fluid flow between the first and second regions and a closed fluid circuit position blocking fluid flow between the first and second regions. The adjuster is operatively connected to the housing to adjust a length of the fluid cavity.

22 Claims, 7 Drawing Sheets

US 8,046,996 B2

MASTER CYLINDER ASSEMBLY FOR A HYDRAULIC ACTUATION SYSTEM FOR A HANDLEBAR-STEERED VEHICLE

RELATED APPLICATION DATA

This application is a continuation-in-part of U.S. application Ser. No. 11/761,194 filed on Jun. 11, 2007, entitled "Master Cylinder Assembly for a Hydraulic Actuation System for a Handlebar-Steered Vehicle."

BACKGROUND OF THE INVENTION

The present invention relates to hydraulic actuation systems for handlebar-steered vehicles and more particularly to a master cylinder assembly for a hydraulic actuation system having an adjuster for adjusting a length of a fluid cavity.

SUMMARY OF THE INVENTION

The present invention provides a master cylinder for a hydraulic actuation system for a handlebar-steered vehicle that has an adjustable dead band. The master cylinder assembly generally includes a housing, a piston assembly, an actuator and an adjuster. The housing is mountable to a frame member of the handlebar-steered vehicle and has a chamber including a fluid cavity with first and second regions. The first region is in fluid communication with the hydraulic actuation system. The piston assembly includes a piston slidably disposed within the fluid cavity. The actuator is operatively connected to the housing and operatively connected to the piston to slidably displace the piston between an open fluid circuit position permitting fluid flow between the first and second regions and a closed fluid circuit position blocking fluid flow between the first and second regions. The adjuster is operatively connected to the housing to adjust a length of the fluid cavity.

In one embodiment of the present invention, the housing includes discrete first and second portions displaceable relative to each other upon actuation of the adjuster to adjust the length of the fluid cavity to vary a distance the piston displaces between a rest position and an initial closed circuit position. The adjuster includes a rotatable sleeve rotatably connected to the first portion of the housing and threadably connected to the second portion of the housing.

In another embodiment of the present invention, the master cylinder assembly further includes a first seal disposed on either the piston or a wall of the fluid cavity. The first seal may be configured to be in sealing engagement between the fluid cavity wall and the piston with the piston in the closed fluid circuit position to block fluid flow between the first and second fluid cavity regions. The first seal may be configured to be in non-sealing disengagement between the fluid cavity wall and the piston with the piston in the open fluid circuit position to permit fluid flow between the first and second fluid cavity regions.

In another embodiment of the present invention, the piston is slidably displaced between the open fluid circuit position in the second fluid cavity region having a second cross-sectional area and the closed fluid circuit position in the first fluid cavity region having a first cross-sectional area, the second cross-sectional area being greater than the first cross-sectional area. The fluid cavity may include a tapered transitional region connecting the first and second fluid cavity regions. The first region of the fluid cavity may be cylindrical.

In another embodiment of the present invention, the master cylinder assembly may include a second seal. The piston may be biased toward the open fluid circuit position and may include first and second portions. The first seal is disposed on the first portion of the piston and the second seal is disposed on the second portion of the piston. The second seal is configured to be in sealing engagement between the second portion of the piston and a wall of the second fluid cavity region. The master cylinder assembly may further include a flexible bladder having a first end attached to the first portion of the piston and a second end attached to the second portion of the piston. The chamber includes an air cavity. The flexible bladder sealingly separates the fluid cavity from the air cavity.

The master cylinder assembly may further include a reach adjuster for adjusting a rest position of the actuator relative to the handlebar. The length of the fluid cavity is configured to be adjusted independently of the rest position of the actuator.

In another embodiment of the present invention, the master cylinder assembly further includes a timing port in a wall of the fluid cavity connecting the first and second fluid cavity regions. A first seal is disposed on the piston in sealing engagement between the fluid cavity wall and the piston. The first seal is configured to cover the timing port with the piston in the closed circuit position to block fluid flow between the first and second fluid cavity regions and is configured to uncover the timing port with the piston in the open fluid circuit position to permit fluid flow between the first and second fluid cavity regions.

These and other features and advantages of the present invention will be more fully understood from the following description of one or more embodiments of the invention, taken together with the accompanying drawings.

DETAILED DESCRIPTION

Figure 1:
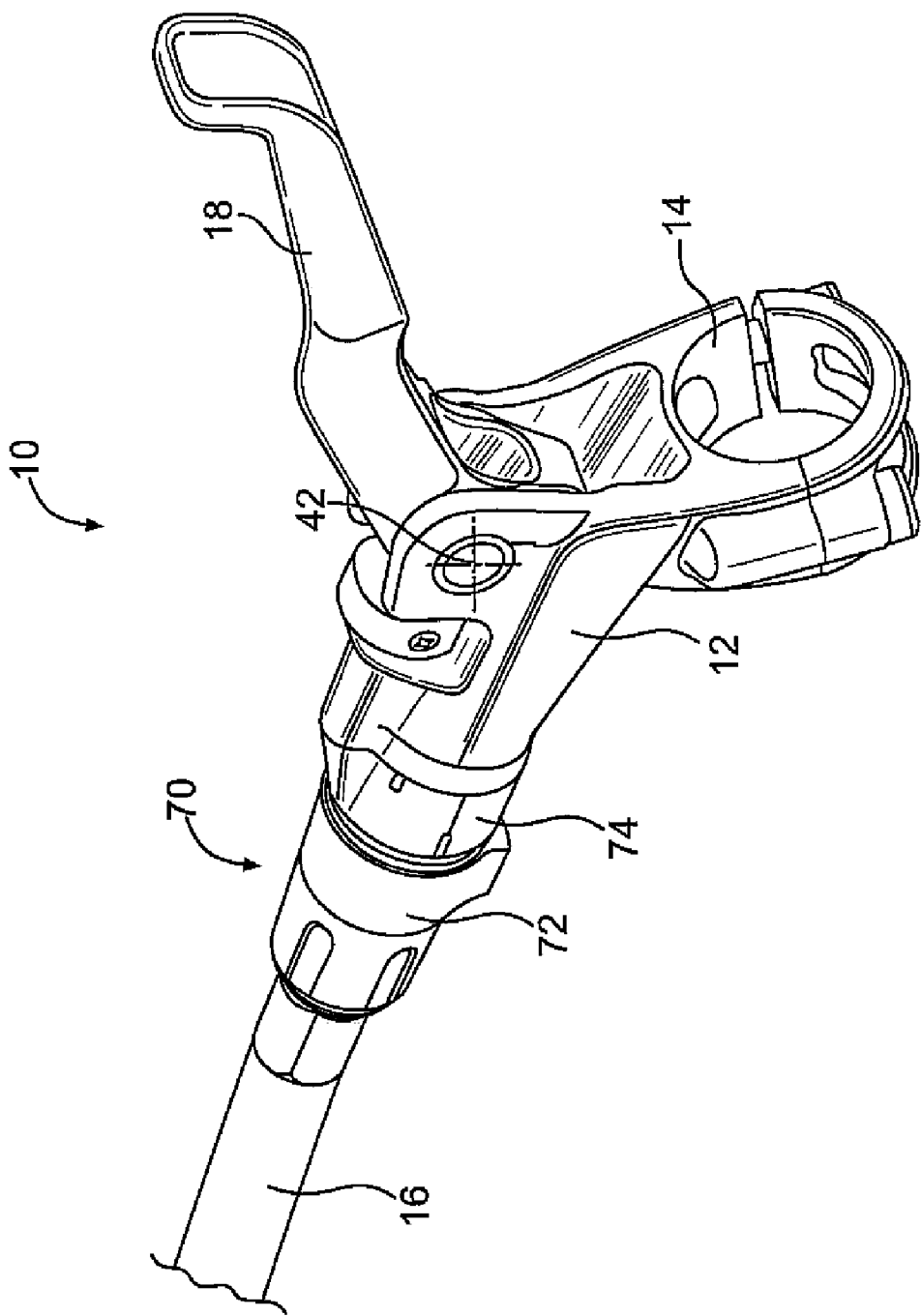
FIG. 1 is a perspective view of a master cylinder assembly according to one embodiment of the present invention.

FIGS. 1-4 illustrate a master cylinder assembly 10 for a hydraulic actuation system for a handlebar-steered vehicle according to one embodiment of the present invention. The master cylinder assembly 10 includes a housing 12 mountable to a frame member of the handlebar-steered vehicle, in this embodiment, to a handlebar 13 with a clamp 14. The master cylinder assembly 10 is operatively connected to a slave cylinder assembly (not shown) by a hydraulic line 16 to operate the hydraulic actuation system. In this embodiment, the master cylinder assembly 10 is designed to be used with a bicycle hydraulic brake system but may be adapted for use with a clutch system or the like. The master cylinder assembly 10 generally includes the housing 12, a fluid cavity 20, an actuator 18, a piston assembly 22 and an adjuster 70.

The housing 12 includes a chamber 11 that includes a fluid cavity 20 and an air cavity 21. The housing 12 includes discrete first and second portions 38, 40. The fluid cavity 20 includes first and second regions 28, 30 and a tapered transitional region 32 therebetween. In the embodiment shown, the first fluid cavity region 28 has a smaller cross-sectional area than a cross-sectional area of the second fluid cavity region 30. One end of the first region 28 is in fluid communication with the hydraulic line 16 and the other end is adjacent the tapered transitional region 32 of the fluid cavity 20. In this embodiment, the transitional region 32 is tapered but may have a different shape or may be eliminated entirely, for example, by a stepped transition between first and second regions 28, 30. The first and second regions 28, 30, in this embodiment are cylindrical, however, the regions 28, 30 may form a variety of shapes.

Figure 2:
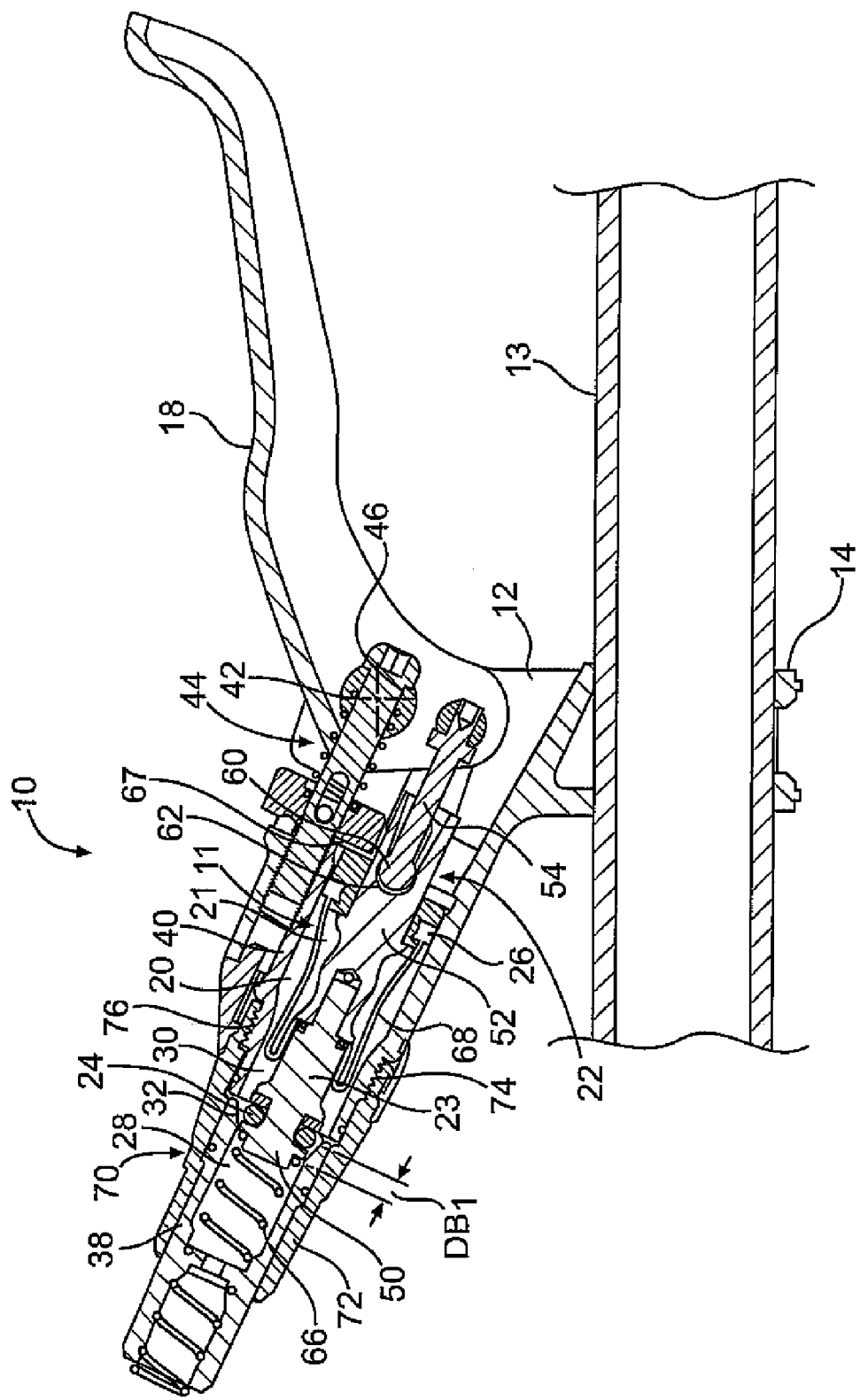
FIG. 2 is a cross-sectional view of the master cylinder assembly of FIG. 1 showing a piston in an open circuit position.
Figure 3:
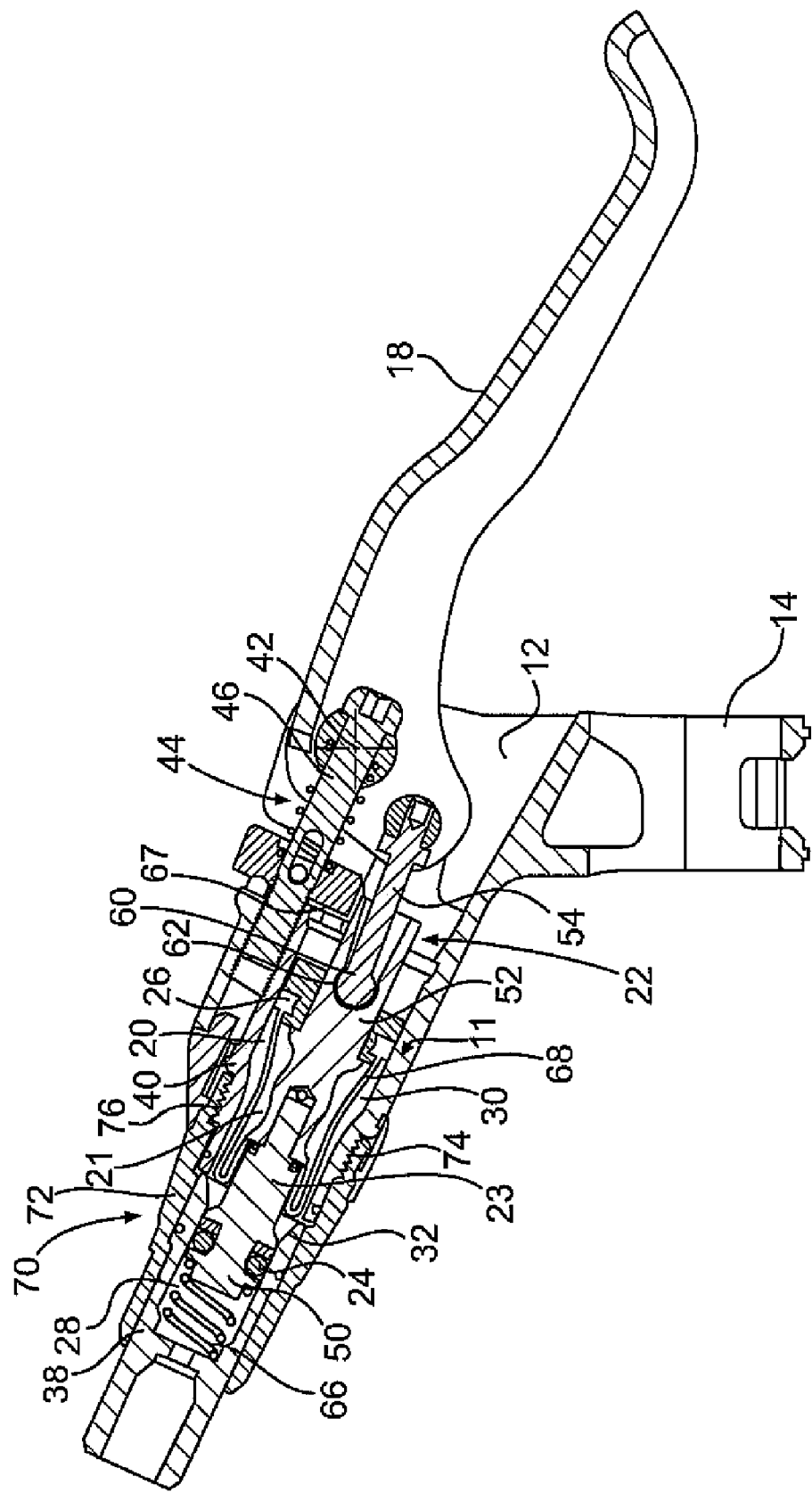
FIG. 3 is a cross-sectional view of the master cylinder assembly of FIG. 1 showing the piston in a closed circuit position.

The actuator 18, in this embodiment a lever, is pivotably connected to the housing 12 about a pivot axis 42. The actuator 18 is movable between a rest position (FIG. 2) and an actuated position (FIG. 3). The distance between the handlebar 12 and the actuator 18 in the rest position may be adjusted by a reach adjuster 44. The reach adjuster 44 includes a screw 46 extending through the actuator 18 and threadably connected to the housing 12. The screw 46 may be rotated to adjust the rest position of the actuator 18 closer or further from the handlebar 12.

Figure 5:
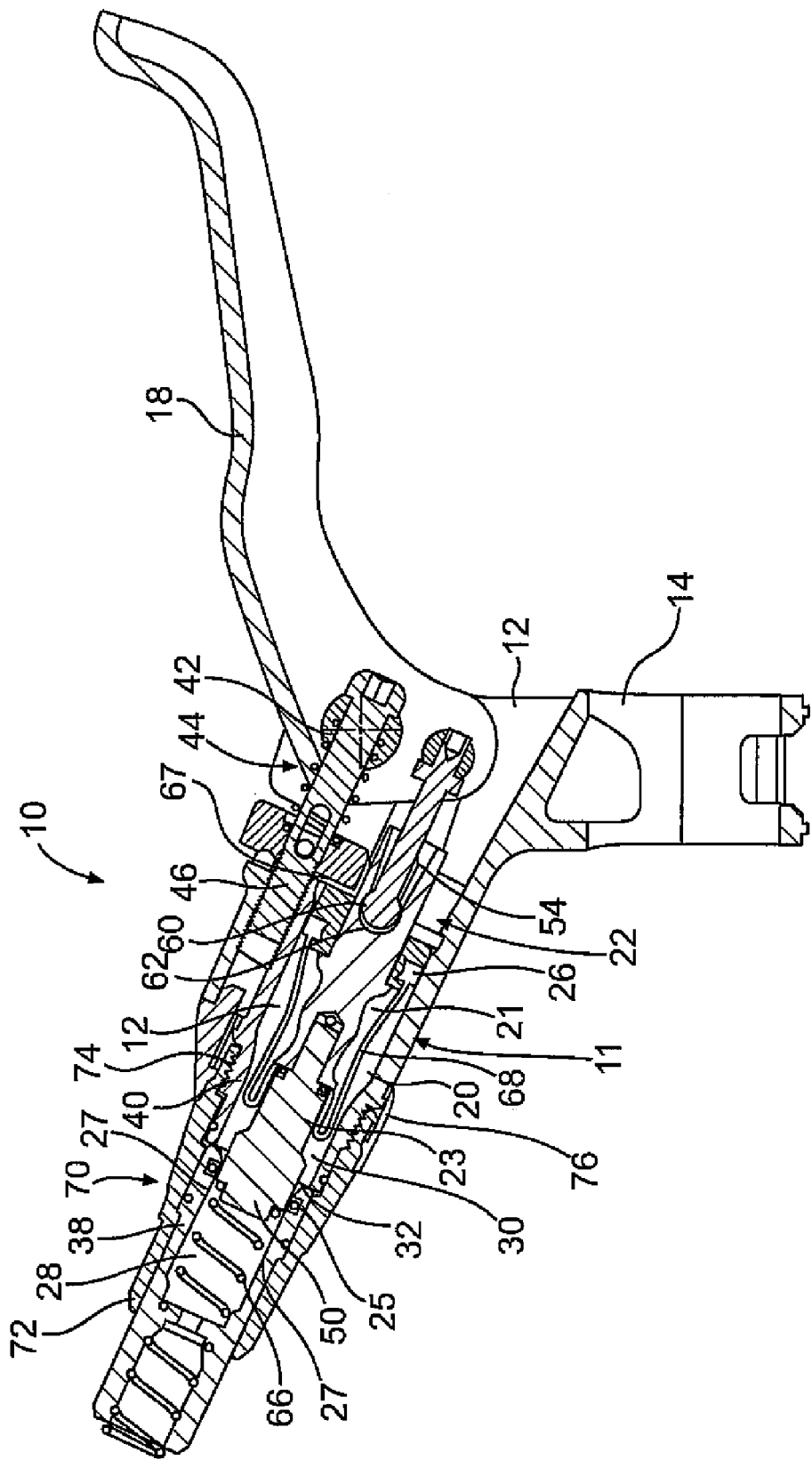
FIG. 5 is a cross-sectional view of a master cylinder assembly according to another embodiment of the present invention.

The piston assembly 22 includes a piston 23 that is slidably disposed within the fluid cavity 20 and has first and second portions 50, 52. The piston 23 is slidably displaceable between an open fluid circuit position (see FIG. 2) that permits fluid flow between the first and second fluid cavity regions 28, 30, and a closed fluid circuit position (see FIG. 3) that blocks fluid flow between the first and second fluid cavity regions 28, 30. The distance the piston 23 slides between its rest position, corresponding to the actuator rest position, and the initial closed fluid circuit position is referred to as the dead band. A first seal 24, in this embodiment an O-ring, is disposed on the first portion 50 of the piston 23 and a second seal 26 is disposed on the second portion 52 of the piston 23. Alternatively, in another embodiment, a first seal 25 may be disposed on a wall 27 of the fluid cavity 20 (see FIG. 5). A pushrod 54 is connected to the second portion 52 of the piston 23. An end of the pushrod 54 includes a ball surface 60 received in a corresponding cup surface 62 in the second portion 52 of the piston 23. A coil spring 66 is disposed in the first fluid cavity region 28 and is configured to abut the first portion 50 of the piston 23 to bias the piston 23 toward the open fluid circuit position against a stop element 67. A flexible bladder 68 surrounds a portion of the piston 23. One end of the bladder 68 is attached to the first portion 50 of the piston 23 and the other end of the bladder 68 is attached to the second portion 52 of the piston 23. The flexible bladder 68 sealingly separates the air cavity 21 from the fluid cavity 20. In this embodiment, the second seal 26 and the bladder 68 embody a single piece.

Figure 4:
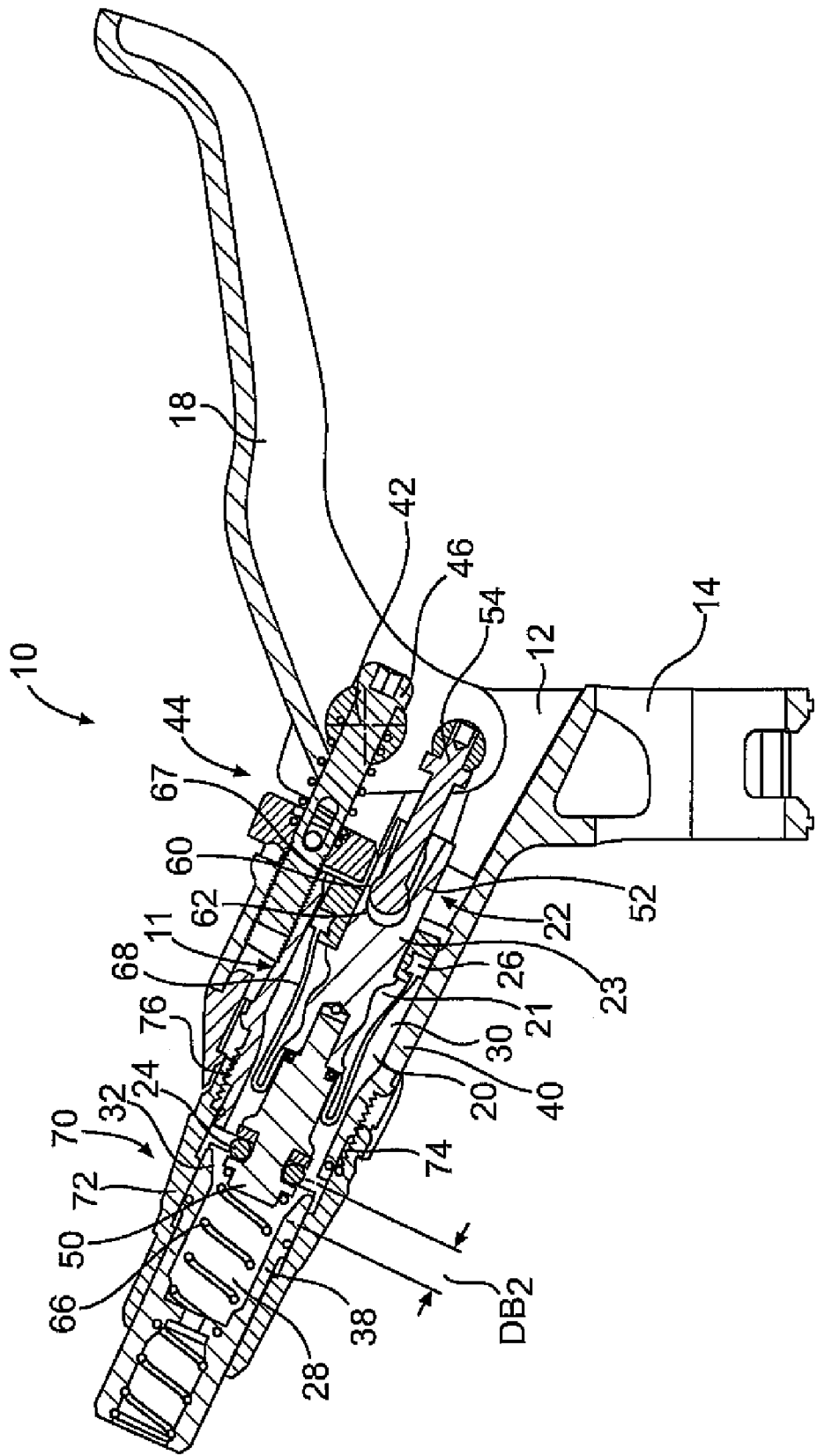
FIG. 4 is a cross-sectional view of the master cylinder assembly of FIG. 1 showing a fluid cavity having a different length than the fluid cavity of FIGS. 2 and 3.

The adjuster 70 includes a rotatable sleeve 72 rotatably connected to the first portion 38 of the housing 12 permitting rotation of the sleeve 72 relative to the first portion 38. The sleeve 72 includes threads 74 cooperatively engaging threads 76 disposed on the second portion 40 of the housing 12. To adjust the length of the fluid cavity 20, the sleeve 72 is rotated, causing the first housing portion 38 to displace toward or away from the second housing portion 40. By adjusting the length of the fluid cavity 20, the dead band or the distance the piston 23 must slide between its rest position and the initial closed fluid circuit position is adjusted. FIG. 2 shows a first dead band $DB_1$ and FIG. 4 shows a second dead band $DB_2$. With this configuration, the dead band may be adjusted independently of the rest position of the actuator 18.

Looking to FIG. 2, the actuator 18 is shown in a rest position with the first seal 24 in non-sealing disengagement between the fluid cavity wall and the piston 23 with the piston 23 in the open fluid circuit position to permit fluid flow between the first and second fluid cavity regions 28, 30. For the first seal 24 to be in non-sealing disengagement, the first seal 24 need not be disengaged from both the fluid cavity wall and the piston 23.

Looking to FIG. 3, as the actuator 18 is pivoted toward the clamp 14, the pushrod 54 is driven toward the first fluid cavity region 28, which in turn, causes the piston 23 to slidably displace toward the first fluid cavity region 28. As the piston 23 slidably displaces toward the first fluid cavity region 28, the first seal 24 sealingly engages between a wall of the first fluid cavity region 28 and the piston 23 thereby closing the fluid circuit to block fluid between the first and second fluid cavity regions 28, 30. This blockage builds pressure in the first fluid cavity region 28, and in turn, pressurizes fluid within the hydraulic line 16 resulting in actuation of the slave cylinder assembly (not shown) of the hydraulic brake system. In this embodiment, the first seal 24 is alternatively deformed and undeformed to provide sealing engagement and non-sealing disengagement, respectively, between a wall of the first fluid cavity region 28 and the piston 23. As the actuator 18 is further actuated, the pressure in the first fluid cavity region 38 increases, resulting in increased braking force. When the actuator 18 is released, the spring 66 displaces the piston 23 back toward the open fluid circuit position, the first seal 24 disengaging the wall of the fluid cavity 20 region to permit fluid flow between the first and second fluid cavity regions 38, 40 thereby equalizing pressure throughout the fluid cavity 20.

Figure 6:
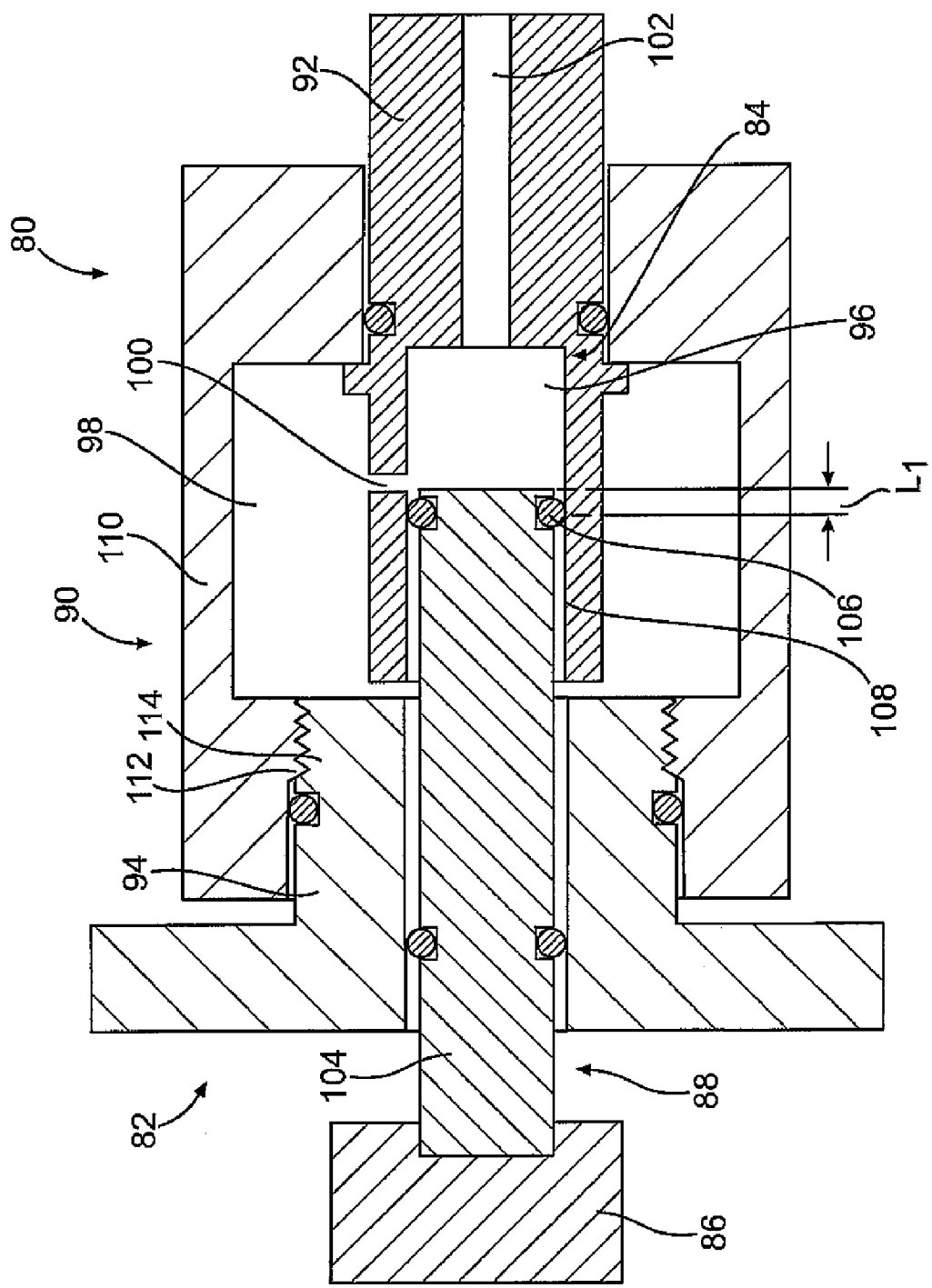
FIG. 6 is a schematic of a master cylinder assembly according to another embodiment of the present invention.

Looking to FIG. 6, an alternative master cylinder assembly 80 is shown generally having a housing 82, a fluid cavity 84, an actuator 86, a piston assembly 88 and an adjuster 90. The housing 82 includes discrete first and second portions 92, 94. The second housing portion 94 is fixed to the handlebar (not shown). The fluid cavity 84 includes first and second regions 96, 98, and a timing port 100 therebetween. An end 102 of the first fluid cavity region 96 is in fluid communication with the hydraulic line connected to the slave cylinder assembly (not shown). The actuator 86 is operatively connected to a piston 104 of the piston assembly 88 to slidably displace the piston 104 between an open fluid circuit position, its rest position, that permits fluid flow between the first and second fluid cavity regions 96, 98 and a closed circuit position, initially blocking the timing port 100, to block fluid flow between the first and second fluid cavity regions 96, 98. A first seal 106 is disposed on the piston 104 in sealing engagement between a fluid cavity wall 108 and the piston 104. The first seal 106 is configured to cover the timing port 100 with the piston 104 in the closed circuit position and is configured to uncover the timing port 100 with the piston 104 in the open circuit position. A dead band is defined by a distance $L_1$ that the piston 104 slides between its rest position and the timing port 100.

The adjuster 90 includes a rotatable sleeve 110 rotatably connected to the first housing portion 92 permitting rotation of the sleeve 110 relative to the first housing portion 92. The rotatable sleeve 110 includes threads 112 cooperatively engaging threads 114 disposed on the second housing portion 94 of the housing 82. To adjust the length of the fluid cavity, the sleeve 110 is rotated, causing the first housing portion 92 to displace toward or away from the second housing portion 94. By adjusting the length of the fluid cavity 84, the dead band is adjusted. With this configuration, the dead band may be adjusted independently of a rest position of the actuator 86.

Figure 7:
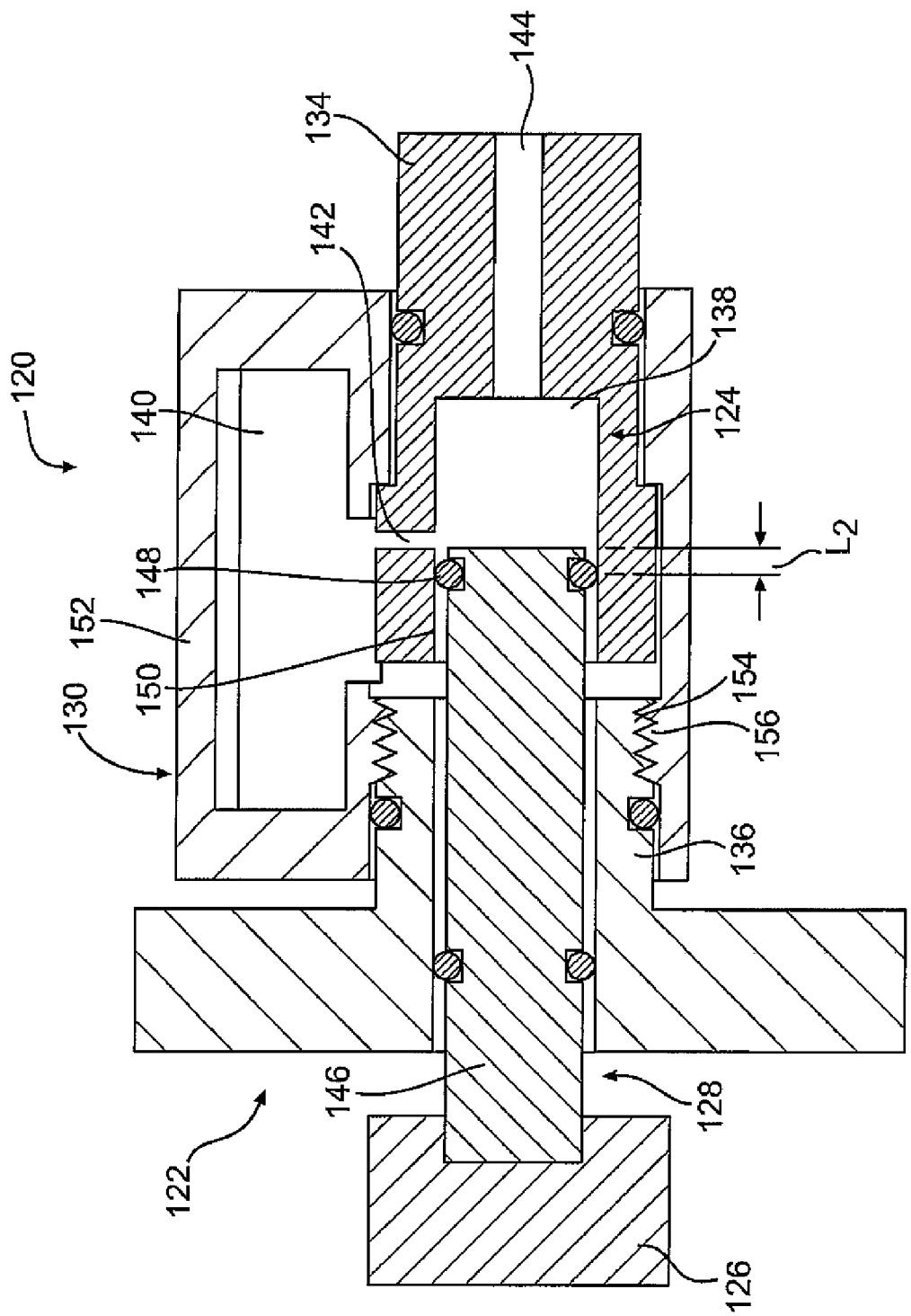
FIG. 7 is a schematic of a master cylinder assembly according to another embodiment of the present invention.

Looking to FIG. 7, a master cylinder assembly 120 according to another embodiment of the present invention is shown which is similar to the master cylinder assembly 80 of FIG. 6. The master cylinder assembly 120 generally includes a housing 122, a fluid cavity 124, an actuator 126, a piston assembly 128 and an adjuster 130. The housing 122 includes discrete first and second portions 134, 136. The second housing portion 136 is fixed to a handlebar (not shown). The fluid cavity 124 includes first and second regions 138, 140, and a timing port 142 therebetween. An end 144 of the first fluid cavity region 138 is in fluid communication with the hydraulic line connected to the slave cylinder assembly (not shown). The actuator 126 is operatively connected to a piston 146 of the piston assembly 128 to slidably displace the piston 146 between an open fluid circuit position, its rest position, that permits fluid flow between the first and second fluid cavity regions 138, 140 and a closed circuit position, initially blocking the timing port 142, to block fluid flow between the first and second fluid cavity regions 138, 140. A first seal 148 is disposed on the piston 146 in sealing engagement between a fluid cavity wall 150 and the piston 102. The first seal 148 is configured to cover the timing port 142 with the piston 146 in the closed circuit position and is configured to uncover the timing port 142 with the piston 146 in the open circuit position. A dead band is defined by a distance $L_2$ that the piston 146 slides between its rest position and the timing port 142.

The adjuster 130 includes a rotatable sleeve 152 rotatably connected to the first housing portion 134 permitting rotation of the sleeve 152 relative to the first housing portion 134. The rotatable sleeve 152 includes threads 154 cooperatively engaging threads 156 disposed on the second housing portion 136. To adjust the length of the fluid cavity 124, the sleeve 152 is rotated, causing the first housing portion 134 to displace toward or away from the second housing portion 136. By adjusting the length of the fluid cavity 124, the dead band is adjusted. With this configuration, the dead band may be adjusted independently of the rest position of the actuator 126.

While this invention has been described by reference to one or more embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed:

1. A master cylinder assembly for a hydraulic actuation system for a handlebar-steered vehicle, the master cylinder assembly comprising:
   a housing mountable to a frame member of the handlebar-steered vehicle and having a chamber including a fluid cavity with first and second regions, the first region in fluid communication with the hydraulic actuation system;
   a piston assembly including a piston slidably disposed within the fluid cavity;
   an actuator operatively connected to the housing and operatively connected to the piston to slidably displace the piston between an open fluid circuit position permitting fluid flow between the first and second regions and a closed fluid circuit position blocking fluid flow between the first and second regions; and
   an adjuster operatively connected to the housing to adjust a length of the fluid cavity.

2. The master cylinder assembly of claim 1, wherein the housing includes discrete first and second portions displaceable relative to each other upon actuation of the adjuster to adjust the length of the fluid cavity to vary a distance the piston displaces between a rest position and an initial closed circuit position.

3. The master cylinder assembly of claim 2, wherein the adjuster includes a rotatable sleeve threadably connected to the second portion of the housing and rotatably connected to the first portion of the housing.

4. The master cylinder assembly of claim 3 further comprising a first seal disposed on one of the piston and a wall of the fluid cavity, the first seal configured to be in sealing engagement between the fluid cavity wall and the piston with the piston in the closed fluid circuit position to block fluid flow between the first and second fluid cavity regions, the first seal configured to be in non-sealing disengagement between the fluid cavity wall and the piston with the piston in the open fluid circuit position to permit fluid flow between the first and second fluid cavity regions.

5. The master cylinder assembly of claim 4, wherein the piston is slidably displaced between the open fluid circuit position in the second fluid cavity region having a second cross-sectional area and the closed fluid circuit position in the first fluid cavity region having a first cross-sectional area, the second cross-sectional area being greater than the first cross-sectional area.

6. The master cylinder assembly of claim 5, wherein the first seal is configured to be deformed in sealing engagement between the fluid cavity wall and the piston with the piston in the closed fluid circuit position, the first seal configured to be undeformed in non-sealing disengagement between the fluid cavity wall and the piston with the piston in the open fluid circuit position.

7. The master cylinder assembly of claim 6, wherein the piston is biased toward the open fluid circuit position.

8. The master cylinder assembly of claim 7, wherein the actuator is a lever pivotably attached to the housing and the frame member is a handlebar.

9. The master cylinder assembly of claim 8, wherein the fluid cavity includes a tapered transitional region connecting the first and second fluid cavity regions.

10. The master cylinder assembly of claim 9, wherein the first region of the fluid cavity is cylindrical.

11. The master cylinder assembly of claim 10 further comprising a second seal, the piston includes first and second portions, the first seal disposed on the first portion of the piston, the second seal disposed on the second portion of the piston and configured to be in sealing engagement between the second portion of the piston and a wall of the second fluid cavity region.

12. The master cylinder assembly of claim 11 further comprising a flexible bladder having a first end attached to the first portion of the piston and a second end attached to the second portion of the piston, the chamber including an air cavity, the flexible bladder sealingly separating the fluid cavity from the air cavity.

13. The master cylinder assembly of claim 12 further comprising a reach adjuster operatively connected to the lever for adjusting a rest position of the lever relative to the handlebar, the length of the fluid cavity configured to be adjusted independently of the adjustment of the rest position of the lever.

14. The master cylinder assembly of claim 3, further comprising a timing port in a wall of the fluid cavity connecting the first and second fluid cavity regions, a first seal disposed on the piston in sealing engagement between the fluid cavity wall and the piston, the first seal configured to cover the timing port with the piston in the closed circuit position to block fluid flow between the first and second fluid cavity regions, the first seal configured to uncover the timing port with the piston in the open fluid circuit position to permit fluid flow between the first and second fluid cavity regions.

15. The master cylinder assembly of claim 1, wherein the piston is slidably displaced between the open fluid circuit position in the second fluid cavity region having a second cross-sectional area and the closed fluid circuit position in the first fluid cavity region having a first cross-sectional area, the second cross-sectional area being greater than the first cross-sectional area.

16. The master cylinder assembly of claim 15, wherein the fluid cavity includes a tapered transitional region connecting the first and second fluid cavity regions.

17. A master cylinder assembly for a hydraulic actuation system for a handlebar-steered vehicle, the master cylinder assembly comprising:
 housing means mountable to a frame member of the handlebar-steered vehicle and having a chamber including a fluid cavity with first and second regions, the first region in fluid communication with the hydraulic actuation system;
 piston assembly means including a piston slidably disposed within the fluid cavity;
 actuator means operatively connected to the housing means and operatively connected to the piston to slidably displace the piston between an open fluid circuit position permitting fluid flow between the first and second regions and a closed fluid circuit position blocking fluid flow between the first and second regions; and
 adjuster means operatively connected to the housing means to adjust a length of the fluid cavity.

18. The master cylinder assembly of claim 17, wherein the housing means includes discrete first and second portions displaceable relative to each other upon actuation of the adjuster means to adjust the length of the fluid cavity to vary a distance the piston displaces between a rest position and an initial closed circuit position.

19. The master cylinder assembly of claim 18, wherein the adjuster means includes a rotatable sleeve threadably connected to the second portion of the housing means and rotatably connected to the first portion of the housing means.

20. The master cylinder assembly of claim 19 further comprising first seal means disposed on one of the piston and a wall of the fluid cavity, the first seal means configured to be in sealing engagement between the fluid cavity wall and the piston with the piston in the closed fluid circuit position to block fluid flow between the first and second fluid cavity regions, the first seal means configured to be in non-sealing disengagement between the fluid cavity wall and the piston with the piston in the open fluid circuit position to permit fluid flow between the first and second fluid cavity regions.

21. The master cylinder assembly of claim 20, wherein the piston is slidably displaced between the open fluid circuit position in the second fluid cavity region having a second cross-sectional area and the closed fluid circuit position in the first fluid cavity region having a first cross-sectional area, the second cross-sectional area being greater than the first cross-sectional area.

22. The master cylinder assembly of claim 19 further comprising timing port means in the fluid cavity wall connecting the first and second fluid cavity regions, first seal means disposed on the piston in sealing engagement between the fluid cavity wall and the piston, the first seal means configured to cover the timing port means with the piston in the closed circuit position to block fluid flow between the first and second fluid cavity regions, the first seal means configured to uncover the timing port means with the piston in the open fluid circuit position to permit fluid flow between the first and second fluid cavity regions.

* * * * *